(12) United States Patent
Boychuk et al.

(10) Patent No.: US 9,069,399 B2
(45) Date of Patent: Jun. 30, 2015

(54) GAIN CORRECTION FOR FAST PANEL SCANNING

(71) Applicant: Cypress Semiconductor Corporation, San Jose, CA (US)

(72) Inventors: Yuriy Boychuk, Lviv (UA); David P. Finch, Bothell, WA (US); Oleksandr Karpin, Lviv (UA); Vasyl Mandziy, Lviv (UA)

(73) Assignee: Cypress Semicoductor Corporation, San Jose, CA (US)

( * ) Notice: Subject to any disclaimer, the term of this patent is extended or adjusted under 35 U.S.C. 154(b) by 191 days.

(21) Appl. No.: 13/630,645

(22) Filed: Sep. 28, 2012

(65) Prior Publication Data
US 2014/0022201 A1 Jan. 23, 2014

Related U.S. Application Data

(60) Provisional application No. 61/672,614, filed on Jul. 17, 2012.

(51) Int. Cl.
*G06F 3/045* (2006.01)
*G06F 3/041* (2006.01)
*G06F 3/044* (2006.01)

(52) U.S. Cl.
CPC .............. *G06F 3/041* (2013.01); *G06F 3/0416* (2013.01); *G06F 3/044* (2013.01)

(58) Field of Classification Search
CPC ................................ G06F 3/044; G06F 3/0416
USPC ........................................ 178/18.01; 345/174
See application file for complete search history.

(56) References Cited

U.S. PATENT DOCUMENTS

| | | | |
|---|---|---|---|
| 5,777,898 A | 7/1998 | Teterwak | |
| 6,977,646 B1 | 12/2005 | Hauck et al. | |
| 8,232,972 B2 | 7/2012 | Huang et al. | |
| 2007/0074913 A1* | 4/2007 | Geaghan et al. | 178/18.06 |
| 2008/0158176 A1 | 7/2008 | Land et al. | |
| 2009/0315850 A1 | 12/2009 | Hotelling et al. | |
| 2011/0156839 A1 | 6/2011 | Martin et al. | |
| 2012/0105369 A1* | 5/2012 | Nakamura | 345/174 |
| 2013/0173202 A1* | 7/2013 | Boerhout | 702/113 |
| 2013/0300707 A1* | 11/2013 | Hershman | 345/174 |

OTHER PUBLICATIONS

"QTAN0079 Buttons, Sliders, and Wheels; Sensor Design Guide", Atmel Corporation, <http://www.atmel.com/Images/doc10752.pdf>; 72 pages.
John Carey, "Remove capacitive touchscreen design barriers with Cypress Gen4", dated Mar. 8, 2012.

* cited by examiner

*Primary Examiner* — Quan-Zhen Wang
*Assistant Examiner* — Chad Dicke

(57) ABSTRACT

A method calculates a correction factor for one or more of capacitance sensors and generates a current from a mutual capacitance of one of the capacitance sensors. The method applies the correction factor to the generated current to generate a corrected current and converts the corrected current to a digital value. The method determines a position of one or more conductive objects in proximity to the one or more capacitance sensors based on the digital value.

18 Claims, 9 Drawing Sheets

GAIN CORRECTION FOR FAST PANEL SCANNING

RELATED APPLICATIONS

This application claims the benefit of U.S. Provisional Application No. 61/672,614, filed on Jul. 17, 2012, which is incorporated by reference herein in its entirety.

TECHNICAL FIELD

This disclosure relates to the field of touch-sensors and, in particular, to mutual capacitance touchscreens.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger or a stylus pen. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

As user interfaces become more complex and feature-rich devices become more demanding, the time it takes to scan a panel is compressed. At the same time, the fidelity and accuracy of the data must also increase or at least keep up with the demands of user interfaces that demand faster scan times and lower power.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

An embodiment of a capacitive sensor array may include sensor elements arranged such that each unit cell corresponding to an intersection between sensor elements may include a main trace and one or more primary subtraces branching away from the main trace. In one embodiment, a sensor element may also include one or more secondary subtraces branching from a primary subtrace, or one or more tertiary subtraces branching from a secondary subtrace. In one embodiment, a sensor array having such a pattern may have decreased signal disparity and reduced manufacturability problems as compared to other patterns, such as a diamond pattern. Specifically, a capacitive sensor array with sensor elements having main traces and subtraces branching from the main trace, such as a totem pole pattern, may be manufactured with decreased cost and increased yield rate, as well as improved optical quality.

An embodiment of such a capacitive sensor array may include a first and a second plurality of sensor elements each intersecting each of the first plurality of sensor elements. Each intersection between one of the first plurality of sensor elements and one of the second plurality of sensor elements may be associated with a corresponding unit cell. A unit cell may be a single node or pixel of capacitance measurement on the capacitive sensor array. In one embodiment, a unit cell corresponding to an intersection may be understood as an area including all locations on the surface of the sensor array that are nearer to the corresponding intersection than to any other intersection between sensor elements.

In one embodiment of a capacitive sensor array, each of the second plurality of sensor elements includes a main trace that crosses at least one of the plurality of unit cells, and further includes, within each unit cell, a primary subtrace that branches away from the main trace. In one embodiment, the primary subtrace may be one of two or more primary subtraces branching symmetrically from opposite sides of the main trace, resembling a "totem pole". Alternatively, the primary subtraces may branch asymmetrically from the main trace.

Figure 1:
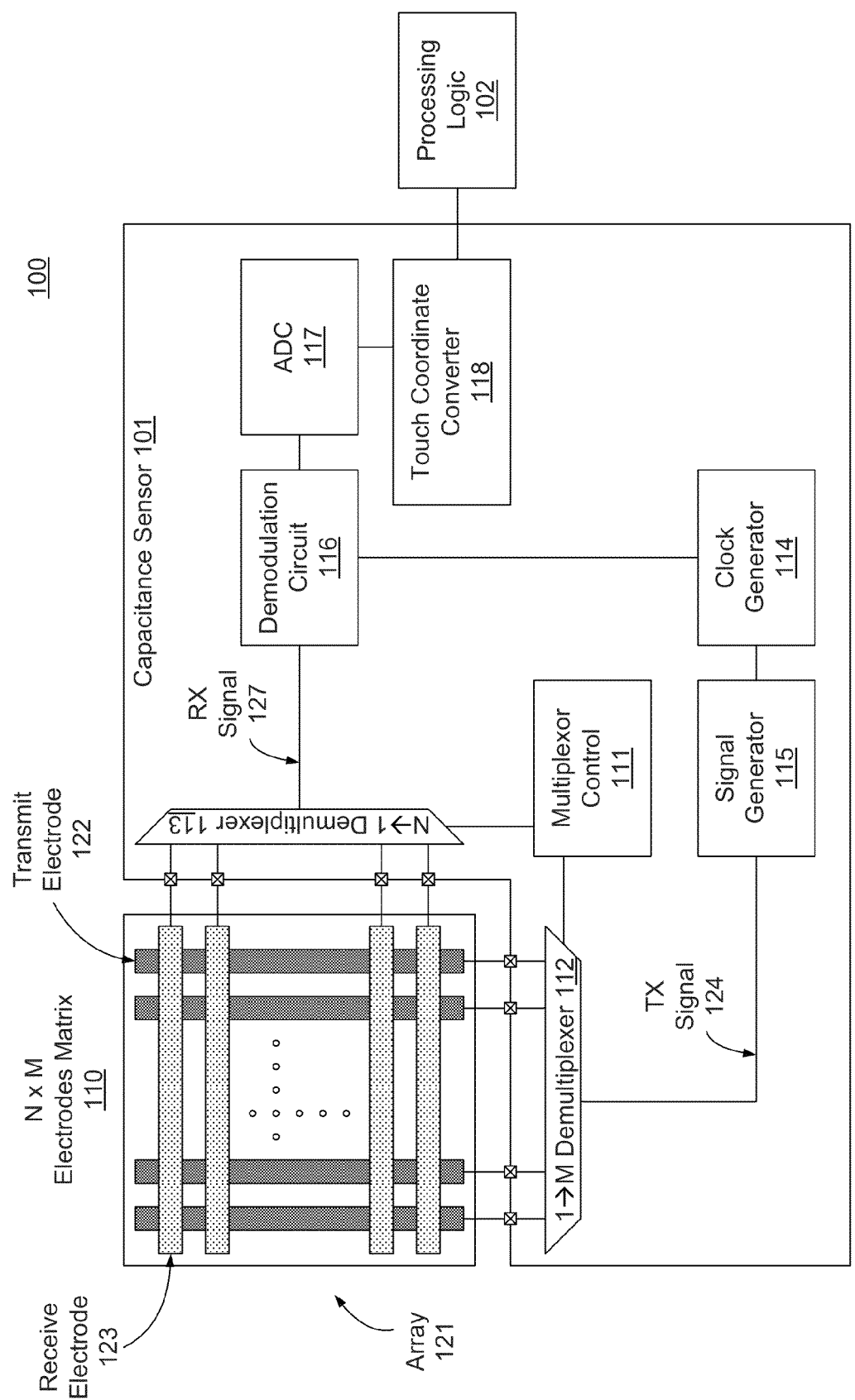
FIG. 1 is a block diagram illustrating an embodiment of an electronic system that processes touch sensor data.

FIG. 1 is a block diagram illustrating one embodiment of a capacitive touch sensor array 121 and a capacitance sensor 101 that converts measured capacitances to coordinates. The coordinates are calculated based on measured capacitances. In one embodiment, touch sensor array 121 and capacitance sensor 101 are implemented in a system such as electronic system 100. Touch sensor array 121 includes a matrix 110 of N×M electrodes (N receive electrodes and M transmit electrodes), which further includes transmit (TX) electrode 122 and receive (RX) electrode 123. Each of the electrodes in matrix 110 may be connected with capacitance sensor 101 through demultiplexer 112 and multiplexer 113.

Capacitance sensor 101 may include multiplexer control 111, demultiplexer 112 and multiplexer 113, clock generator 114, signal generator 115, demodulation circuit 116, and analog-to-digital converter (ADC) 117. ADC 117 is further coupled with touch coordinate converter 118. Touch coordinate converter 118 outputs a signal to the processing logic 102.

The transmit and receive electrodes in the matrix 110 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 122 is capacitively coupled with receive electrode 123 at the point where transmit electrode 122 and receive electrode 123 overlap.

Clock generator 114 supplies a clock signal to signal generator 115, which produces a TX signal 124 to be supplied to the transmit electrodes of touch sensor array 121. In one embodiment, the signal generator 115 includes a set of switches that operate according to the clock signal from clock generator 114. The switches may generate a TX signal 124 by periodically connecting the output of signal generator 115 to a first voltage and then to a second voltage, wherein said first and second voltages are different.

The output of signal generator 115 is connected with demultiplexer 112, which allows the TX signal 124 to be applied to any of the M transmit electrodes of touch sensor array 121. In one embodiment, multiplexer control 111 controls demultiplexer 112 so that the TX signal 124 is applied to each transmit electrode 122 in a controlled sequence. Demultiplexer 112 may also be used to ground, float, or connect an alternate signal to the other transmit electrodes to which the TX signal 124 is not currently being applied.

Because of the capacitive coupling between the transmit and receive electrodes, the TX signal 124 applied to each transmit electrode induces a current within each of the receive electrodes. For instance, when the TX signal 124 is applied to transmit electrode 122 through demultiplexer 112, the TX signal 124 induces an RX signal 127 on the receive electrodes in matrix 110. The RX signal 127 on each of the receive electrodes can then be measured in sequence by using multiplexer 113 to connect each of the N receive electrodes to demodulation circuit 116 in sequence. In one embodiment, multiple multiplexers may allow RX signals to be received in parallel by multiple demodulation circuits.

The mutual capacitance associated with each intersection between a TX electrode and an RX electrode can be sensed by selecting every available combination of TX electrode and an RX electrode using demultiplexer 112 and multiplexer 113. To improve performance, multiplexer 113 may also be segmented to allow more than one of the receive electrodes in matrix 110 to be routed to additional demodulation circuits 116. In an optimized configuration, wherein there is a 1-to-1 correspondence of instances of demodulation circuit 116 with receive electrodes, multiplexer 113 may not be present in the system.

When an object, such as a finger or stylus, approaches the matrix 110, the object causes a decrease in the mutual capacitance between only some of the electrodes. For example, if a finger or stylus is placed near the intersection of transmit electrode 122 and receive electrode 123, the presence of the finger will decrease the mutual capacitance between electrodes 122 and 123. Thus, the location of the finger on the touchpad can be determined by identifying the one or more receive electrodes having a decreased mutual capacitance in addition to identifying the transmit electrode to which the TX signal 124 was applied at the time the decreased mutual capacitance was measured on the one or more receive electrodes.

By determining the mutual capacitances associated with each intersection of electrodes in the matrix 110, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal (RX signal 127) is rectified by demodulation circuit 116. The rectified current output by demodulation circuit 116 can then be filtered and converted to a digital code by ADC 117.

The digital code is converted to touch coordinates indicating a position of an input on touch sensor array 121 by touch coordinate converter 118. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, touch sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 2A:
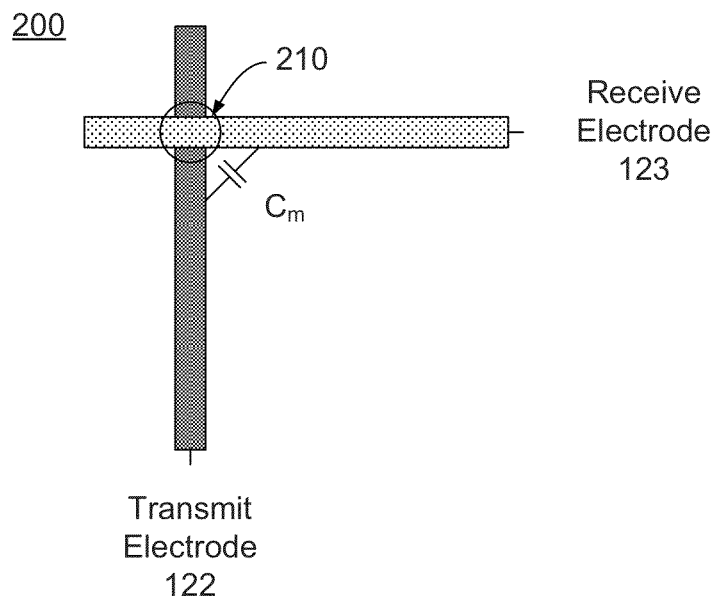
FIG. 2A illustrates an embodiment of a transmit and receive electrode in a mutual capacitance array.

FIG. 2A illustrates an embodiment of a simplified representation 200 of an embodiment of a single intersection, or node 210, of a transmit electrode 122 and a receive electrode 123. Transmit electrode 122 is coupled to 1→M demultiplexer 112 and receive electrode 123 is coupled to N→1 multiplexer 113 as shown in FIG. 1. Node 210 is characterized by mutual capacitance, Cm, between transmit electrode 122 and receive electrode 123. A mutual capacitance, Cm, exists for every intersection between every transmit electrode and every receive electrode in N×M electrode matrix 110 (shown in FIG. 1).

Figure 2B:
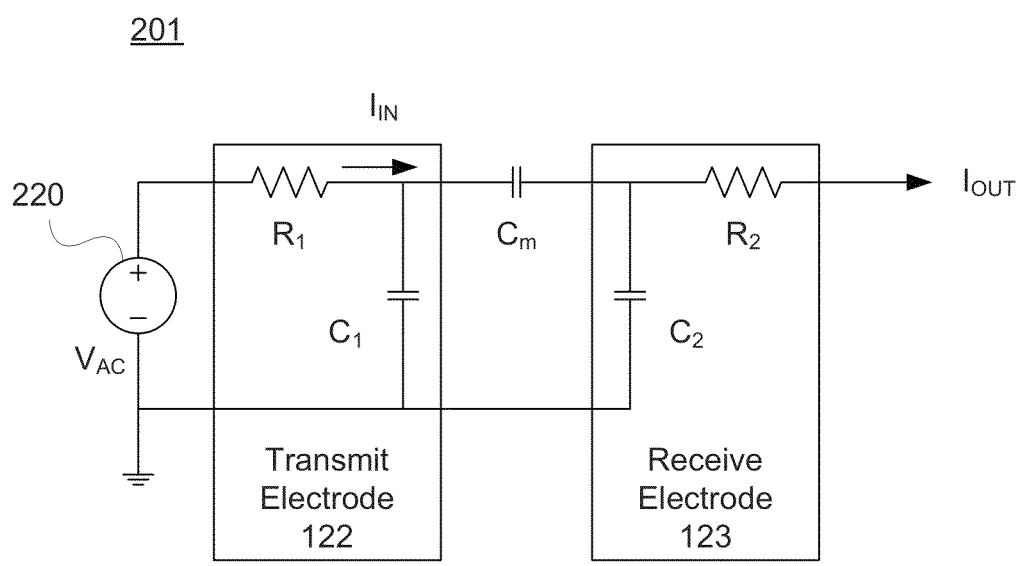
FIG. 2B illustrates a schematic representation of a transmit and receive electrode in a mutual capacitance array.

FIG. 2B illustrates a circuit representation 201 of a single intersection, or node 210, from FIG. 2A. Transmit electrode 122 comprises a resistance, $R_1$, and a parasitic capacitance, $C_1$. Receive electrode 123 comprises a resistance, $R_2$, and a parasitic capacitance, $C_2$. Resistances $R_1$ and $R_2$ are a function of the impedance of transmit electrode 122 and receive electrode 123, respectively. High impedance materials, such as indium tin oxide, limit the rate of charge and discharge on transmit and receive electrodes. Capacitors $C_1$ and $C_2$ represent the parasitic capacitance each electrode has to the rest of the array and the rest of the system for each transmit electrode 122 and each receive electrode 123, respectively. Parasitic capacitances $C_1$ and $C_2$ are the capacitance of each electrode to everything in the system except the transmit or receive electrode that comprises the other side of node 210. Voltage source 220 may provide an alternating voltage source (signal) on transmit electrode 122, thus generating a current, $I_{in}$, through resistor $R_1$, and building a voltage potential on mutual capacitor $C_m$. This voltage potential is then converted to a current, $I_{out}$, through resistor $R_2$. Current $I_{out}$ is representative of the mutual capacitance, $C_m$, between transmit electrode 122 and receive electrode 123.

Figure 3:
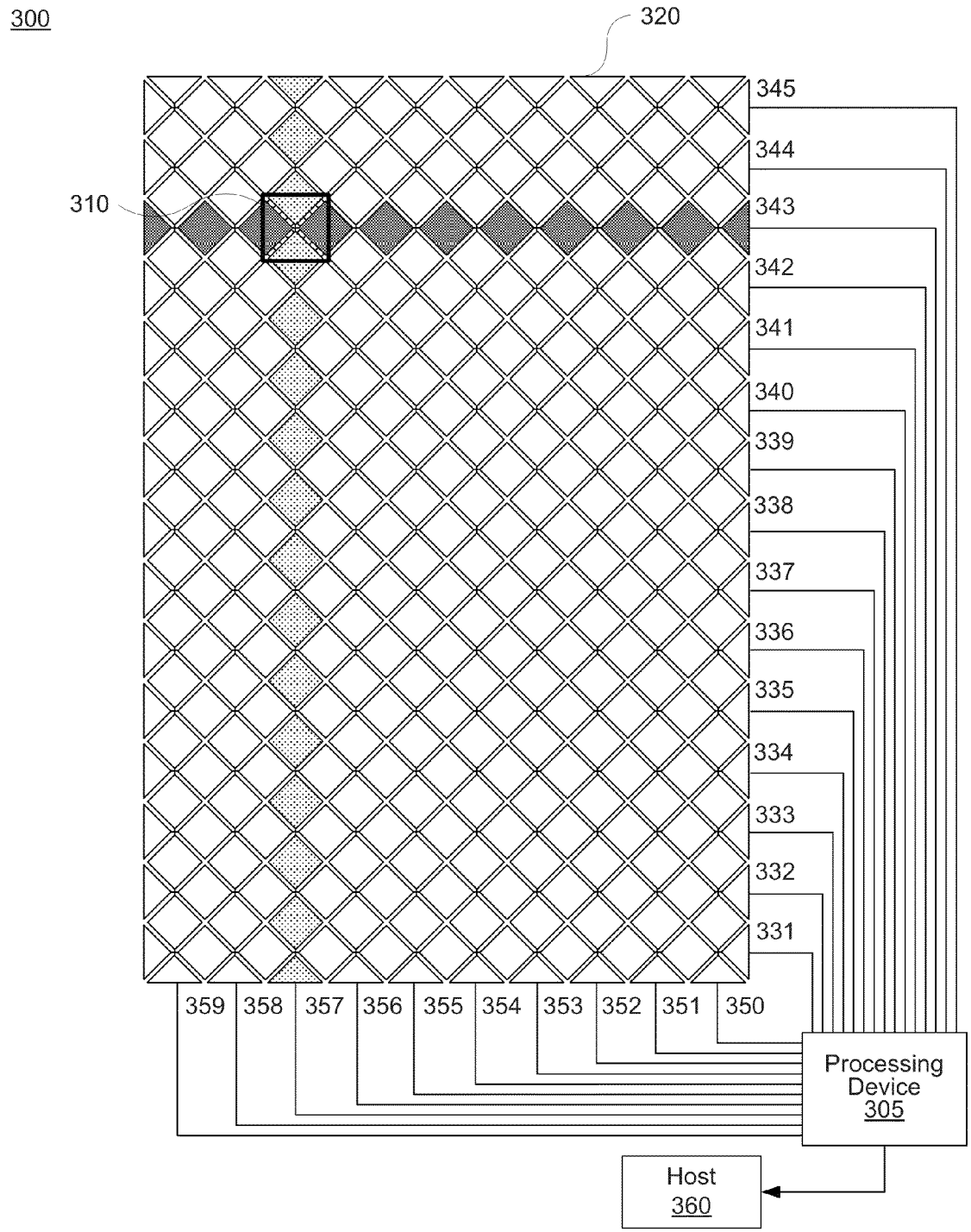
FIG. 3 illustrates an embodiment of a capacitive sensor array having a diamond pattern.

FIG. 3 illustrates an embodiment of a capacitive touch sensing system 300 that includes a capacitive sensor array 320. Capacitive sensor array 320 includes a plurality of row sensor elements 331-345 and a plurality of column sensor elements 350-359. The row and column sensor elements 331-445 and 350-359 are connected to a processing device 305, which may include the functionality of capacitance sensor 101 of FIG. 1. In one embodiment, the processing device 305 may perform TX-RX scans of the capacitive sensor array 320 to measure a mutual capacitance value associated with each of the intersections, or nodes, 310, between a row sensor element and a column sensor element in the sensor array 320. The measured capacitances may be further processed to determine centroid, or center of mass, locations of one or more contacts at the capacitive sensor array 320.

In one embodiment, the processing device 305 is connected to a host 360 which may receive the measured capacitances or calculated centroid locations from the processing device 305.

The capacitive sensor array 320 illustrated in FIG. 3 may include sensor elements arranged in a diamond pattern. Specifically, the sensor elements 331-345 of capacitive sensor array 320 may be arranged in a single solid diamond (SSD) pattern as shown in FIG. 3. In other embodiments, the sensors elements 331-345 and 350-359 may be hollow diamonds ("single hollow diamonds") or may be pairs of diamonds coupled at one or both ends ("dual solid diamonds"). In another embodiment, pairs of hollow diamonds may be coupled at one or both ends ("dual hollow diamonds").

Figure 4:
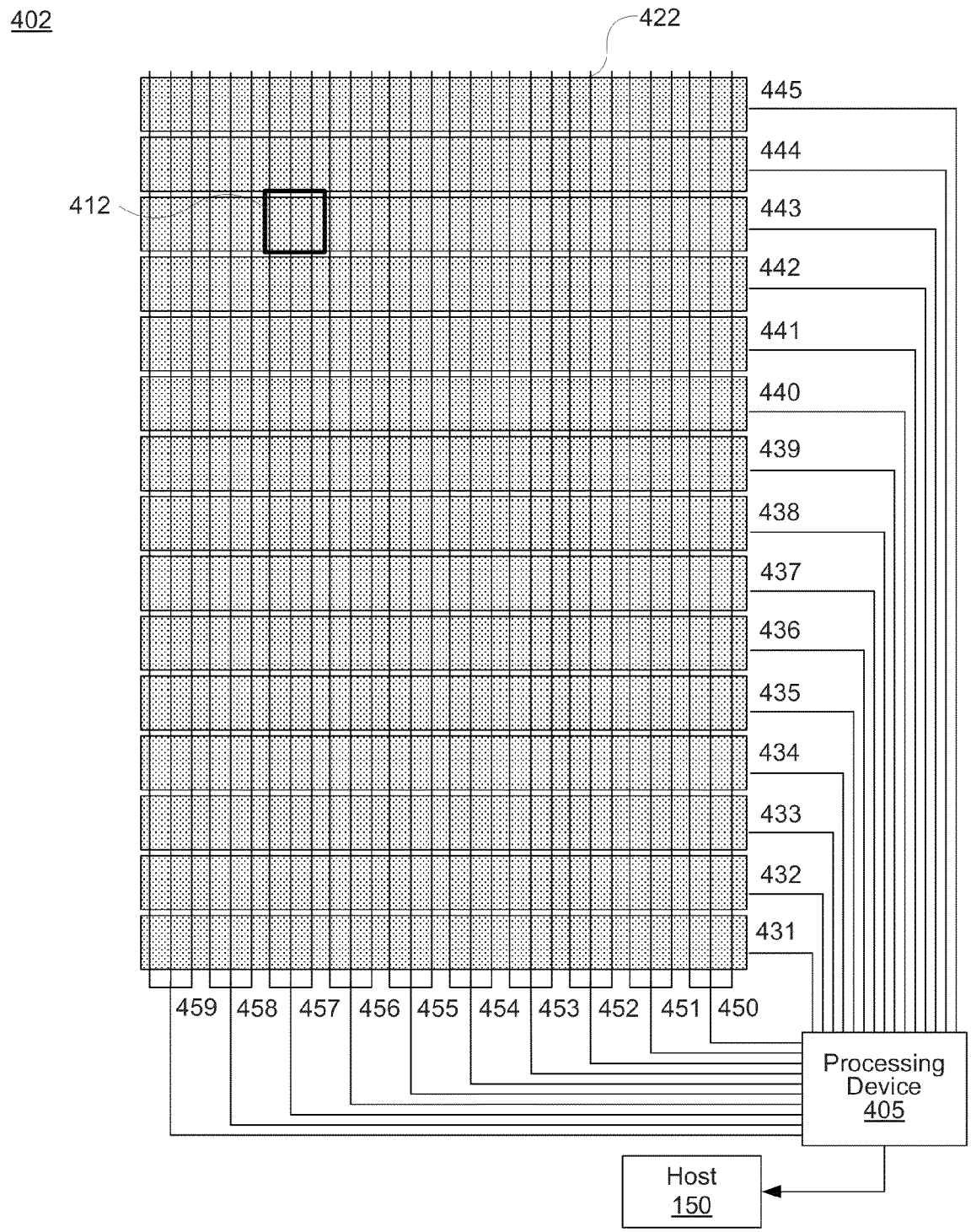
FIG. 4 is a block diagram illustrating an embodiment of an electronic system that processes touch sensor data and is configured to receive on all electrodes.

FIG. 4 illustrates a capacitive sensor array 422 in an alternate embodiment 402. Capacitiove sensor array 422 may comprise a series of stripes (431-445) and bars (450-459), wherein the bars are split into three smaller bars and connected at one or both ends of capacitive sensor array 422. Each bar of the trident formed is electrically equivalent, but more capacitive coupling between transmit bars 450-459 and stripes 431-445 may be accessible to conductive objects such as user fingers and therefore a greater change in capacitance may be measured. The processing device 405 may perform TX-RX scans of the capacitive sensor array 422 to measure a mutual capacitance value associated with each of the intersections, 412, between a row sensor element and a column sensor element in the capacitive sensor array 422. While FIG. 4 illustrates bars 450-459 as having three smaller bars, it is understood that bars 450-459 may have fewer than three smaller bars or more than three smaller bars as needed or allowed by the applications requirements.

The mutual capacitance sensing methods and sensor constructions described herein are meant to be exemplary only. Other methods of mutual capacitance may be utilized to detect capacitance on rows and columns in a self capacitance array or for each array in a mutual capacitance array. Mutual capacitance sensing methods may be used to measure capacitance on single-touch arrays or multi-touch array. In either such embodiments, the same circuitry and processing may be used, but single or multiple contacts may be detected and tracked on the array. In one embodiment, additional contacts that are detected on a multi-touch array may be ignored completely. In another embodiment, capacitance data from additional contacts may be used to determine the location of a single contact based on capacitance data from the entire array.

In one embodiment of a capacitive sensing device configured to measure mutual capacitance, capacitance values for each node (310 or 412) may be stored in a memory such as RAM, ROM, flash or other storage locations. Capacitance values may be the "raw" capacitance values for each node or the compensated capacitance value calculated by subtracting a base capacitance value indicative of a sensor with no conductive object present (i.e. baseline) from the raw capacitance values. In this embodiment, the compensated capacitance values are non-zero only for active nodes, that is, nodes at which there is measurable capacitance change from capacitance measured with no contacts present on the array.

The sensing electrodes of FIGS. 3 and 4 may be constructed of any conductive material, including copper, silver ink, carbon ink, or transparent conductive materials such as indium tin oxide (ITO). Conductors such as silver and carbon ink, and ITO have higher impedance than copper. In a mutual capacitance sensing array utilizing a TX-RX sensing scheme, the signal strength of the transmit electrodes (122, FIG. 1) degrades due to the impedance of the electrode. The farther away from the physical connection to the transmit source the intersection of the transmit and received electrodes is, the weaker the signal by the transmit electrode and the weaker the signal by the receive electrode.

Figure 5:
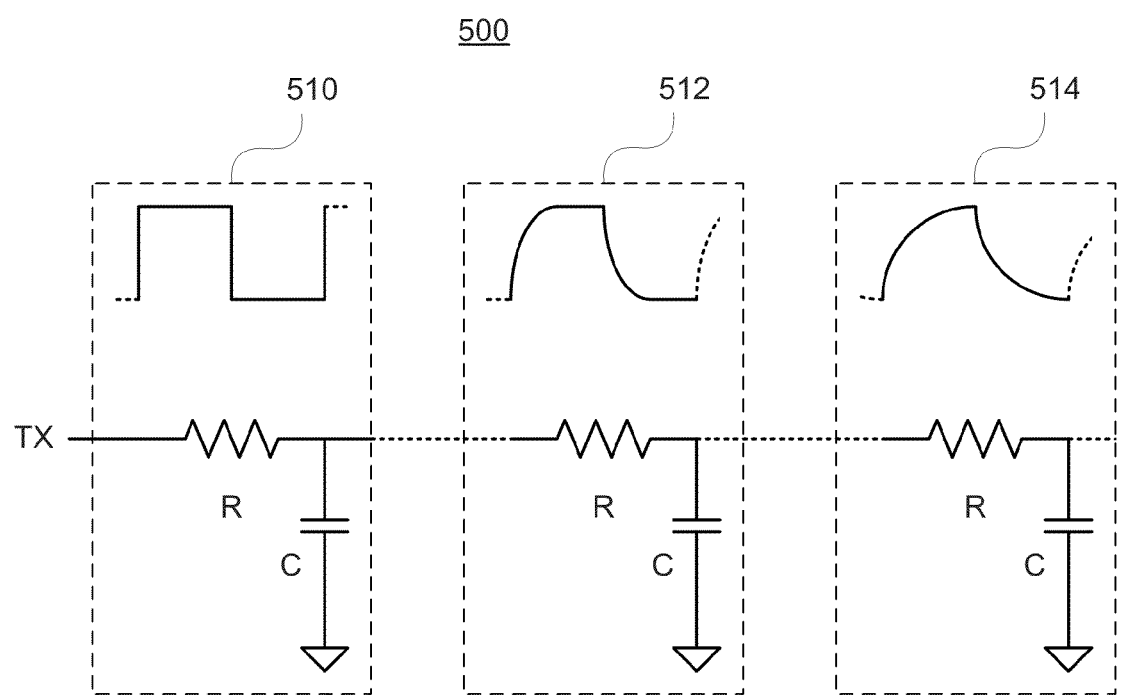
FIG. 5 illustrates a schematic representation of a plurality of mutual capacitance sensing nodes and the associated transmit (TX) signal degradation across the panel.

FIG. 5 illustrates a schematic representation of a plurality of nodes, 510-514, and the corresponding signal loss as the transmit signal travels down them. Each capacitance node, C, (FIG. 2, 210), operates as a low-pass filter (FPF) with the panel resistance, R, of the electrode.

Noise immunity may be improved by operating the mutual capacitance sensor at a higher transmit frequency from signal generator 115 (FIG. 1). However, higher transmit frequencies may result in greater deviation in measured capacitance values at each node in a capacitance sensing panel from the LPF signal degradation. The sensitivity of each node to a conductive object and may be given by:

$$V_{out} = V_{in}\left(1 - e^{\frac{t}{RC}}\right) \quad (1)$$

where R is the series resistance of the electrode to the node and C is the mutual capacitance at the node. $V_{out}$ may be representative of the capacitance at the mutual capacitance node and may be measured according to the circuit shown in FIG. 1.

The position of a conductive input on the capacitance sensing array may be given by the following equations:

$$X_c = \frac{ResX}{N_x} \cdot \left[i + \frac{1}{2} + \frac{2 \cdot S_{i+2} + S_{i+1} - S_{i-1} - 2 \cdot S_{i-2}}{S_{i-2} + S_{i-1} + S_i + S_{i+1} + S_{i+2}}\right] \quad (2)$$

$$Y_c = \frac{ResY}{N_y} \cdot \left[j + \frac{1}{2} + \frac{2 \cdot S_{j+2} + S_{j+1} - S_{j-1} - 2 \cdot S_{j-2}}{S_{j-2} + S_{j-1} + S_j + S_{j+1} + S_{j+2}}\right] \quad (3)$$

where $N_x$ is number of columns, ResX is resolution in X direction, $S_i$ is the sum of signals from each column of 5×5 matrix around local maximum and i is the index of local maximum along the x-axis, and where $N_y$ number of rows, ResY is the resolution in Y direction, $S_j$ is the sum of signals from each row of 5×5 matrix around local maximum and j is the index of local maximum along the y-axis. Therefore, if there is degradation in the signal due to higher impedance of the electrode, this may manifest itself as errors or inaccuracies in the detected position of the conductive object. To compensate for the reduction in the signal, various schemes may be employed to gain the signal for each sensing node of the mutual capacitance sensing array and worked into the scanning method for the array.

Figure 6:
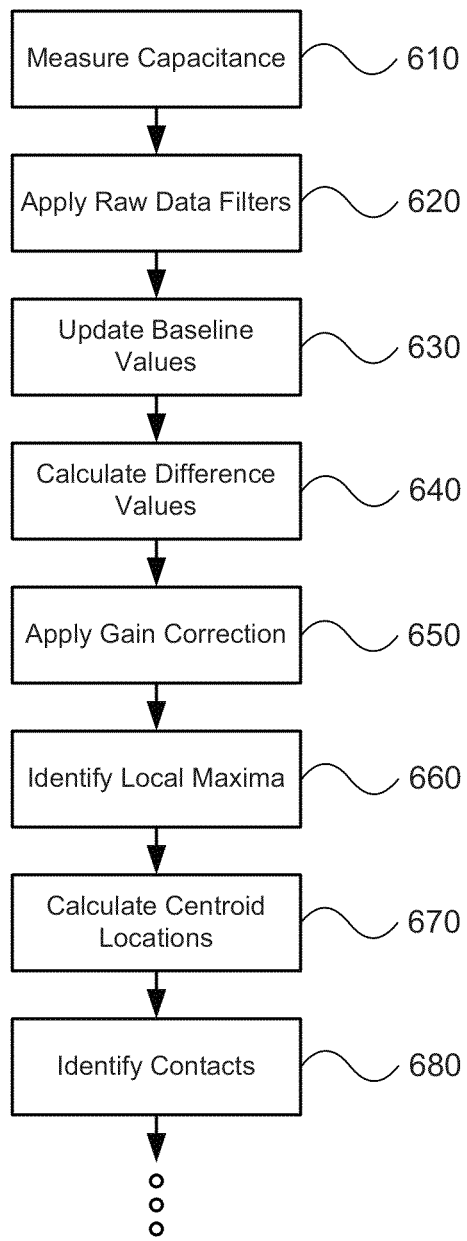
FIG. 6 illustrates an embodiment of a method for measuring capacitance and identifying contacts.

FIG. 6 illustrates one embodiment of a method 600 for measuring capacitance and identifying contacts. The mutual capacitance of each node may be measured according to the sensing circuit of FIG. 1 in block 610. While the mutual capacitance sensing circuit of FIG. 1 is suggested here, it is not intended that it be the only sensing method. Other mutual capacitance sensing methods and circuits may be implemented. Raw data filters may be applied in block 620. Raw data filters may be used to reduce the jitter and noise that may exist in the capacitance system. While running the capacitance sensing circuit at a higher frequency does reduce the noise susceptibility of the system, measured values may still require some basic filtering. The filtered values may then be used to update the baseline capacitance via firmware for each node in block 630. When sensors are not touched, the native capacitance of each sensor may be stored and tracked to keep up with environmental changes that manifest as capacitance or signal changes. A difference value of each node may be calculated at block 640 by subtracting the baseline value for each node from the measured value of the current scan. A gain correction factor may be applied to the difference values in block 650. The corrected difference values may then be used to identify local maxima in block 660. The local maxima may then be used to calculate centroid locations for each touch according to equations 2 and 3 in block 670. The centroids may then be identified as discrete touches and tracked in block 680.

The gain correction of block 650 allows for signal to be normalized according to a slower, more sensitive mutual capacitance measurement.

In one embodiment, a gain may be derived from a comparison of the capacitance sensing values from a plurality of scans performed at different frequencies. At a first, slower frequency, the capacitance sensing values may be measured and recorded. These values may be more indicative of the actual signal at each node because the settling time of the mutual capacitance sensor allows the sensor to be more completely charged and discharged with the square wave transmit signal (FIG. 5). These may then be stored as values according to:

$$\text{MaxDiff} = \max(\text{Diff}[x;y]). \quad (4)$$

The capacitance sensors may then be measured at a second, faster frequency. The RC time constant of the capacitance sensors and the settling time thereof reduces the output voltage, or signal, on each of the nodes depending on their distance from the sensing circuit along the high-impedance sensor. A correction table for each capacitance sensing node may then be given by:

$$\text{SurfaceTABLE}[x; y] = \frac{\text{MaxDiff}}{\text{Diff}[x; y]} \quad (5)$$

where Diff[x;y] is the measured signal at each sensing node at the second, faster frequency. The values for $\text{Surface}_{TABLE}[x;y]$ represent a correction value for each sensing node that may be applied to the measured signal at the second, faster frequency during normal device operation according to:

$$\text{Diff}_{COR}[x;y] = \text{Diff}[x;y] \cdot \text{Surface}_{TABLE}[x;y]. \quad (6)$$

In one embodiment, the measurement at the first, slower frequency may occur during development and the correction table, $\text{Surface}_{TABLE}[x;y]$, may be stored in a memory location within the device. During device operation, the sensing circuit or processing circuit may then apply the values from $\text{Surface}_{TABLE}[x;y]$ to calculate $\text{Diff}_{COR}[x;y]$. The values of $\text{Diff}_{COR}[x;y]$ may then be used to calculate the position one or a plurality of conductive objects on the mutual capacitance sensing array. In another embodiment, the measurement at the first, slower frequency may be done at device startup. The correction table, $\text{Surface}_{TABLE}[x;y]$, may be stored in a memory location within the device. In this embodiment, each node may be scanned at the first, slower frequency before the user begins using the touchscreen. This may provide a more dynamic gain correction value for each node, but requires non-activation of each of the sensors for at least a period of time sufficient to scan the entire array. In still another embodiment, a calibration scheme wherein the array is scanned at a slower frequency may be performed periodically during run time, either automatically by the sensing circuit, or by command of a host controller or the user himself.

Figure 7:
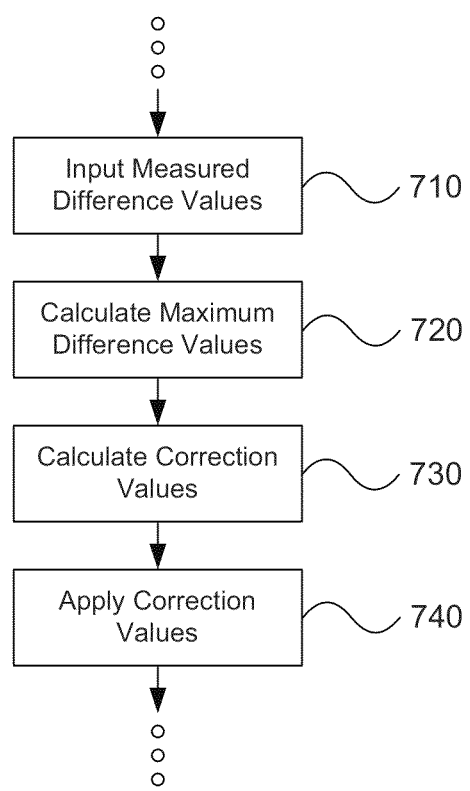
FIG. 7 illustrates an embodiment of a method for per-node gain correction of measured mutual capacitance values.

FIG. 7 illustrates a method 700 of one embodiment of a per-node correction table of gain correction values. The measured difference values are input in block 710. These may be scanned at a first, slower frequency which allows for greater settling the mutual capacitance node. The maximum difference values for each node may then be calculated and stored in block 720. Correction values may be calculated in block 730 by comparing the measured values for each node at the first, slower frequency and a second, faster frequency according to equation 5. The correction values of $\text{Surface}_{TABLE}[x;y]$ from equation 5 may then be applied to Diff[x;y] to produce $\text{Diff}_{COR}[x;y]$ according to equation 6. The values of $\text{Diff}_{COR}[x;y]$ may then be used by the method of FIG. 6 to identify local maxima (block 660) and complete the contact identification.

Figure 8A:
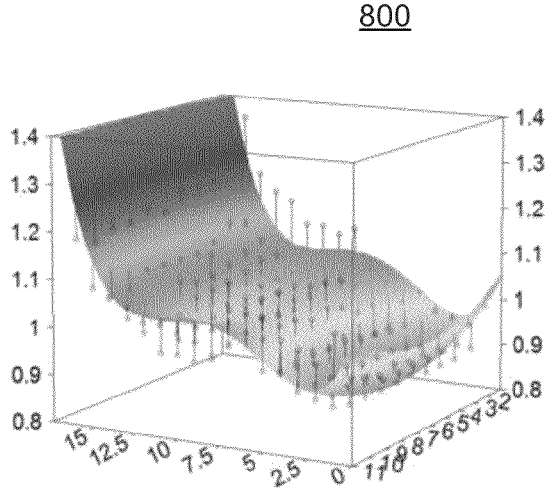
FIG. 8A illustrates an example of a exponential interpolation of difference counts according to one embodiment.

Various compression schemes may be employed to reduce the overall memory or processing power required to correct for the signal degradation at higher transmit frequencies. In one embodiment, an exponential correction factor may be applied. In this embodiment a curve may be fit to the measured difference values at each of the frequencies. The correction factor may be given by:

$$\text{Surface}_{EXP}[x;y] = a + bx + cx^2 + dx^3 + ex^4 + fy + gy^2 \quad (7)$$

where a, b, c, d, e, f, and g are constants and x and y are the coordinates of each node of the array. FIG. 8A illustrates one embodiment 800 of the curve for Surface$_{EXP}$[x;y].

Figure 8B:
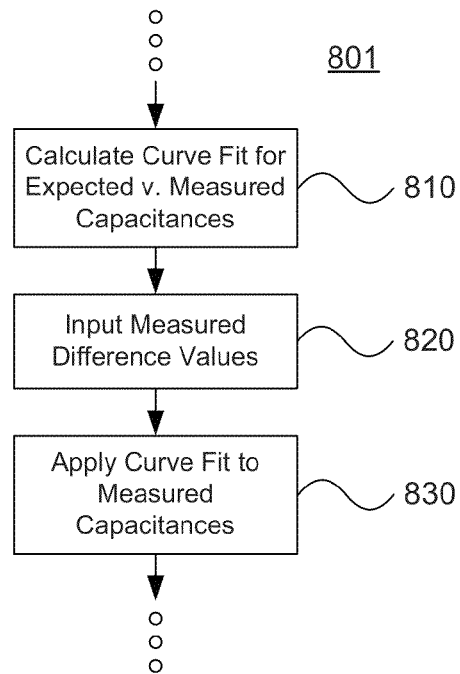
FIG. 8B illustrates an embodiment of a method for exponential interpolation for gain correction of measured mutual capacitance values.

FIG. 8B illustrates one embodiment of a method 801 for correcting values based on a curve fit to difference values. A curve along each axis may be calculated at block 810 based on the expected and measured values of capacitance at each node. This curve may be stored to a memory location. At a subsequent scan, each of the measured values may be collected and then stored in block 820. The curve fit may then be applied to each of the measured values and corrected values, Diff$_{COR}$[x;y], calculated in block 830. Diff$_{COR}$[x;y] may then be applied to the local maxima identification of block 660 (FIG. 6). While this method is not as precise as the table correction method of FIG. 7, the memory and processing required is far less and may allow for faster application of the correction values and scanning.

Figure 8C:
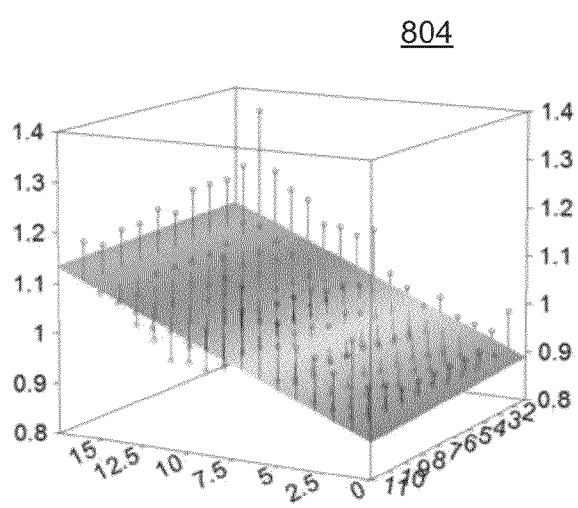
FIG. 8C illustrates an example of a linear interpolation of difference counts according to one embodiment.

In another embodiment, a linear correction factor may be applied. In this embodiment a linear curve may be fit to the measured difference values at each of the frequencies. The correction factor may be given by:

$$\text{Surface}_{LIN}[x;y] = a + bx + cy \quad (8)$$

where a and b are constants and x and y are the coordinates of each node of the array. FIG. 8C illustrates one embodiment 804 of the curve for Surface$_{LIN}$[x;y].

Figure 8D:
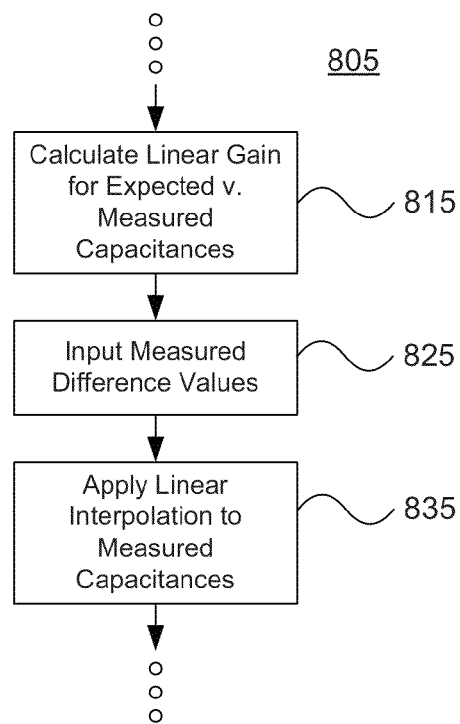
FIG. 8D illustrates an embodiment of a method for linear interpolation for gain correction of measured mutual capacitance values.

FIG. 8D illustrates one embodiment of a method 805 for correcting values based on a curve fit to difference values. A curve along each axis may be calculated at block 815 based on the expected and measured values of capacitance at each node. This curve may be stored to a memory location. At a subsequent scan, each of the measured values may be collected and then stored in block 825. The curve fit may then be applied to each of the measured values and corrected values, Diff$_{COR}$[x;y], calculated in block 835. Diff$_{COR}$[x;y] may then be applied to the local maxima identification of block 660 (FIG. 6). While this method is not as precise as the table correction method of FIG. 7 or the exponential curve fit of FIG. 8B, the memory and processing required is far less and may allow for faster application of the correction values and scanning.

Figure 9:
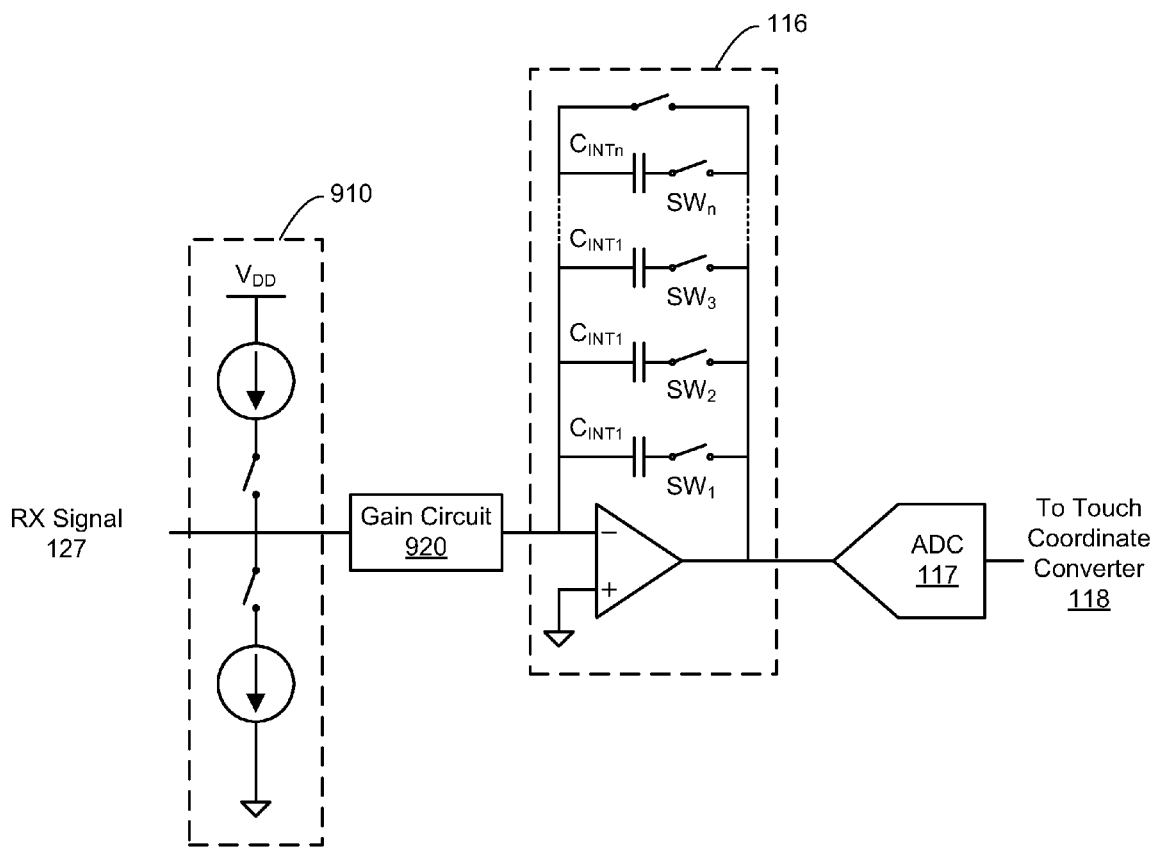
FIG. 9 illustrates an embodiment of circuit configurable for hardware gain correction.

While FIGS. 8B and 8D illustrate mathematical embodiments to gain correction for mutual capacitance sensing inputs, in other embodiments gain correction may be accomplished in hardware. FIG. 9 illustrates one embodiment of the receive channel of capacitance sensor 101, including the demodulation circuit 116 and ADC 117. RX signal 127 may be subjected to a hardware baselining circuit 910 comprising a plurality of programmable current sources. The baseline-corrected input from RX signal 127 may then be input to gain circuit 920. Gain circuit may be configured to provide fractional or multiplicative gain to the baseline-corrected input. In the case of fractional gain, the attenuation ratio of gain circuit 920 may be chosen to reduce the current that is input to the demodulation circuit 116. In the case of multiplicative gain, the current that is input to demodulation circuit 116 may be increased. For both attenuation and gain by gain circuit 920, the output of gain circuit is input to demodulation circuit 116. Demodulation circuit 116 may be configured to convert the current output of gain circuit 116 to a voltage on at least one integration capacitors, $C_{INT1}$-$C_{INTn}$. Integration capacitors may be coupled to each other in parallel to increase or decrease the value of the total integration capacitance. By increasing the value of the integration capacitance of the demodulation circuit 116, the voltage input to ADC 117 may be less with the same current from gain circuit 920, thus reducing the output signal that is output to the touch coordinate converter 118. By decreasing the value of the integration capacitance of the demodulation circuit 116, the voltage input to ADC 117 may be greater with the same current from gain circuit 920, thus increasing the input signal that is output to the touch coordinate converter 118.

The settings of gain circuit 920 and the integration capacitance of demodulation circuit 116 may be determined during development and stored in a table. In another embodiment, they may be derived at run time by comparing measured values and expected values according to the method in FIG. 7.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method comprising:
    generating a correction factor for at least one of a plurality of capacitance sensors of a mutual capacitance touch sensing array, wherein the calculating a correction factor comprises
        converting a second mutual capacitance of the plurality of capacitance sensors to a second digital value at a first transmit frequency,
        converting a third mutual capacitance of the plurality of capacitance sensors to a third digital value at a second transmit frequency, comparing the second and third digital values, and
calculating the correction factor based on the comparison of the second and third digital values;
generating a current derived from a first mutual capacitance of the at least one of the plurality of capacitance sensors;
applying the correction factor to the generated current to generate a corrected current;
converting the corrected current to a first digital value; and
determining a position of at least one conductive object in proximity to the plurality of capacitance sensors based on the digital value.

2. The method claim 1, wherein the comparison of the second and third digital values occurs during manufacturing of the plurality of capacitance sensors.

3. The method claim 1, wherein the comparison of the second and third digital values occurs at device start up.

4. The method claim 1, wherein the comparison of the second and third digital values generates a curve fit corresponding to differences between digital values of each of the plurality of capacitance sensors.

5. The method claim 4, wherein the curve fit is an exponential relationship.

6. The method claim 4, wherein the applying the correction factor to the generated current of the at least one of the plurality of capacitance sensors comprises multiplying the generated current by the calculated correction factor.

7. The method of claim 1, wherein the correction factor is a value of an integration capacitor of a capacitance measurement circuit.

8. The method of claim 1, wherein the correction factor is an attenuation ratio on an input of a capacitance measurement circuit.

9. An apparatus comprising:
a plurality of mutual capacitance touch sensors;
signal transmit circuitry coupled to each of the plurality of mutual capacitance sensors, the transmit circuit configurable to generate a plurality of signals, the plurality of signals having different frequencies;
signal receive circuitry coupled to each of the plurality of mutual capacitance sensors, the receive circuitry configurable to convert a current derived from the transmit signal and a first mutual capacitance to a first digital value representative of the transmit signal and the mutual capacitance of the sensor; and
processing circuitry configurable to:
receive the digital value,
apply a correction factor to the current generated by the transmit signal and the mutual capacitance of the at least one of the plurality of capacitance sensors, the correction factor generated by:
converting a second mutual capacitance at a first transmit frequency to a second digital value
converting a third mutual capacitance at a second transmit frequency to a third digital value,
comparing the second and third digital values, and
calculating the correction factor based on the comparison of the second and third digital values, and
determine a position of at least one conductive object in proximity to the plurality of capacitance sensors based on a corrected current from the generated current and the correction factor.

10. The apparatus of claim 9, wherein the correction factor is calculated from a curve fit of the differences between the second and third digital values.

11. The apparatus of claim 10, wherein the curve fit is an exponential relationship.

12. The apparatus of claim 11, wherein the correction factor is calculated during device manufacturing and stored in a memory.

13. The apparatus of claim 9, wherein the correction factor is a value of an integration capacitor of a capacitance measurement circuit.

14. The apparatus of claim 9, wherein the correction factor is an attenuation ratio on an input of a capacitance measurement circuit.

15. A system comprising:
a mutual capacitance touch sensing array configurable to be driven at a plurality of frequencies;
mutual capacitance measurement circuitry configured to convert a current derived from the plurality of frequencies and a first mutual capacitance of each of a plurality of nodes of the mutual capacitance sensing array to digital values representative of the first mutual capacitance of each of the plurality of nodes of the mutual capacitance sensing array; and
processing circuitry configurable to:
receive the digital value representative of the transmit signal and the mutual capacitance of the sensor,
apply a correction factor to the generated current derived from the plurality of frequencies and the at least one of the plurality of capacitance sensors to produce a corrected current, the correction factor generated by:
converting a second mutual capacitance at a first transmit frequency to a second digital value,
converting a third mutual capacitance at a second transmit frequency to a third digital value,
comparing the second and third digital values, and
calculating the correction factor based on the comparison of the second and third digital values, and
determine a position of at least one conductive object in proximity to the plurality of capacitance sensors based on the digital values from the corrected current.

16. The system of claim 15, wherein the correction factor is calculated from a curve fit of the differences between second and third digital values.

17. The system of claim 15, wherein the correction factor is a value of an integration capacitor of a capacitance measurement circuit.

18. The system of claim 15, wherein the correction factor is an attenuation ratio on an input of a capacitance measurement circuit.

* * * * *